Patented Aug. 9, 1949

2,478,473

UNITED STATES PATENT OFFICE 2,478,473

PROCESS OF RECOVERING NICOTINE FROM NICOTINE-BEARING PLANT MATERIAL

Roderick Koenig Eskew, Glenside, Pa., assignor to the United States of America as represented by the Secretary of Agriculture No Drawing. Application August 22, 1947, Serial No. 770,181

4 Claims. (Cl. 260—291)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a process for recovering nicotine from nicotine bearing plant materials, such as *Nicotiana rustica* and *Nicotiana tabacum*, and has among its objects the recovery of the nicotine by distillation with water in a comparatively high yield and high concentration of the nicotine in the distillate. Obtaining the nicotine in a more concentrated solution is of considerable advantage, since the richer distillates require less subsequent concentrating to produce concentrates to meet the requirements for the nicotine and nicotine sulfate solutions of commerce.

The vapor pressure of nicotine is quite low and consequently it cannot be distilled under atmospheric pressures unless another lower boiling solvent be included with the nicotine in the still. Water is the usual solvent for this purpose. I have found that if sufficient water be included at the beginning of the distillation, substantially all the nicotine may be removed. In this case, however, the concentration of the nicotine in the distillate will be low. On the other hand, if the quantity of water be limited to give a higher concentration, the yield of nicotine is decreased.

To exhibit this, an experiment was run in which green *Nicotiana rustica* plants were comminuted, screened, treated with lime to release the nicotine from the plant material, and the resulting mass distilled under atmospheric pressure. The water included in the still in this instance was that present in the original green plants. The yield was 97%, but the concentration of nicotine in the distillate was only about 0.5%.

To exhibit the effect of limiting the water to give a higher concentration of the nicotine, another experiment was run in which the green plants were partially dried to a water content of 57%, before the lime treatment and distilling. In this instance, a distillate having a nicotine concentration of 2.25% was obtained, but the yield was only about 85%, the balance of the nicotine being lost in the residue.

In general, according to the present invention, the water contained in the mass of comminuted, alkalinized, nicotine-bearing plant material is limited at the beginning of the distillation, the quantity being insufficient to distill out all the nicotine with the water. The amount of water present at this stage of the process may vary over rather wide limits, depending somewhat upon the nature of the plant material employed and upon the concentration of nicotine desired in the distillate. From 5 to 30 pounds of water per pound of nicotine contained in the plants may be used. As distillation proceeds, more water is added to the still, the addition being preferably at about the rate the water is distilled out with the nicotine. This may be accomplished stepwise by intermittently stopping the distilling and adding more water, or accomplished continuously by adding the water (preferably as steam) into a batch being distilled as the distillation proceeds, in the latter case, the water preferably being added at the minimum rate required for the nicotine to distill over. In either event, the rate of addition of water preferably is such that both the nicotine and water are substantially simultaneously exhausted from the still, the quantity of water added being sufficient and preferably not substantially in excess of that required to distill out most of the nicotine.

The total amount of water contained in the material at the beginning of distillation and added during the distillation may vary within considerable limits and yet result in good yields and high concentrations of nicotine in the distillate, although increasing the amount of water correspondingly decreases the concentration. A total amount of water of from 32 to 65 pounds per pound of nicotine distilled, depending somewhat on the nicotine content of the material being distilled, gives good results.

The following example, employing a stepwise procedure, exhibits the invention in greater detail:

Example 240 pounds green weight of *Nicotiana rustica* plants containing about 1.154 pounds of nicotine (4.28% nicotine on a dry weight basis) is ground in a hammer mill using a screen with half-inch holes. This slurry is then charged into a steam-jacketed agitated still equipped with condenser, receiver and vacuum pump. A vacuum of 28° of mercury is drawn and while agitating, the material is dried under vacuum until about 10.5 pounds of water (about 9 pounds per pound of nicotine) remains in the material in the still.

At this point the vacuum is broken and 24 pounds of lime is added. The still is then closed, and the mixture agitated for 15 minutes. Steam is then turned into the jacket and distillation carried out at atmospheric pressure until no further distillate is obtained. The distillate thus obtained will have a concentration of about 2.6% nicotine. 7.3 pounds of water (about 9.9 pounds per pound nicotine) is then added to the still bringing the water content of the material in the still to about 19%. Distillation is again carried out at atmospheric pressure until no further condensate is obtained. The distillate thus obtained will have a concentration of over 2% nicotine. 7.3 pounds of water is again added and distillation carried out as in the preceding step. The distillate thus obtained will contain about 1½% nicotine.

Since a little nicotine will yet remain in the still, a vacuum is drawn at this point and more nicotine is recovered at a concentration of 3.4% in the distillate.

All of these distillates may be then combined and the nicotine will be found to exist in them at a concentration of about 2.25%, and 95% of the nicotine will have been distilled from the plants.

In the foregoing example, it will be seen that only about 43 pounds of water was distilled per pound of nicotine. In contrast to this, if sufficient water for all the nicotine to be distilled over and for the nicotine and water both to be substantially exhausted from the still at the same time were added at the beginning of distillation, approximately 99 pounds of water per pound of nicotine would be required. The use of less than about 99 pounds of water per pound of nicotine distilled would result in a decrease in nicotine recovery.

Although in the above example lime was used as the alkalinizing agent, other agents such as soda, ammonia, etc., may be substituted.

Having thus described the invention, what is claimed is:

1. A process of recovering nicotine from a nicotine-bearing plant material comprising distilling a comminuted and alkalinized nicotine-bearing plant material containing from 5 to 30 pounds of water per pound of nicotine, and adding water to the still during the distillation in a quantity sufficient to distill out substantially all of the nicotine.

2. The process of claim 1, characterized in that the quantity of water contained in the material and added during the distillation is from 32 to 65 pounds per pound of nicotine distilled.

3. The process of claim 2, characterized in that the water is added substantially at the same rate that it is distilled out with the nicotine.

4. A process of recovering nicotine from a nicotine-bearing plant material comprising comminuting a fresh nicotine-bearing plant, removing the water therefrom until the remaining water is from 5 to 30 pounds per pound of nicotine contained in the plant material, mixing an alkali with the resulting mass to release the nicotine from the plant material, and distilling the alkalinized mass under atmospheric pressure to distill out nicotine with water, the while adding water to the still at a rate such that both the water and nicotine will be substantially simultaneously exhausted from the still.

RODERICK KOENIG ESKEW.

REFERENCES CITED

The following references are of record in the file of this patent:

UNITED STATES PATENTS

| Number | Name | Date |
|---|---|---|
| 620,406 | Bauning | Feb. 28, 1899 |
| 1,078,427 | Glaystein | Nov. 11, 1913 |
| 1,153,974 | Terry | Sept. 21, 1915 |
| 1,538,265 | Arnold | May 19, 1925 |
| 1,823,554 | Mewborne | Sept. 15, 1931 |